(12) United States Patent
Yoo

(10) Patent No.: US 10,504,506 B2
(45) Date of Patent: Dec. 10, 2019

(54) NEURAL NETWORK METHOD AND APPARATUS

(71) Applicant: SAMSUNG ELECTRONICS CO., LTD., Suwon-si (KR)

(72) Inventor: Sang Hyun Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 35 days.

(21) Appl. No.: 15/834,416

(22) Filed: Dec. 7, 2017

(65) Prior Publication Data

US 2019/0051291 A1 Feb. 14, 2019

(30) Foreign Application Priority Data

Aug. 14, 2017 (KR) .......... 10-2017-0103044

(51) Int. Cl.
*G10L 15/16* (2006.01)
*G06N 3/04* (2006.01)
(Continued)

(52) U.S. Cl.
CPC .......... *G10L 15/16* (2013.01); *G06N 3/0454* (2013.01); *G06N 3/084* (2013.01); *G10L 15/063* (2013.01); *G10L 15/20* (2013.01); *G10L 15/22* (2013.01)

(58) Field of Classification Search
CPC ....... G10L 15/16; G10L 15/20; G10L 15/187; G10L 15/22; G10L 17/02; G10L 19/09;
(Continued)

(56) References Cited

U.S. PATENT DOCUMENTS 7,164,117 B2 * 1/2007 Breed .............. B60R 21/01516
250/208.1
9,002,765 B1 * 4/2015 Ravuri .................. G06N 3/082
706/27
(Continued)

FOREIGN PATENT DOCUMENTS

KR 10-2016-0089210 A 7/2016
KR 10-2016-0136381 A 11/2016
KR 10-2017-0046751 A 5/2017

OTHER PUBLICATIONS

Wang, Chong, et al., "Lookahead Convolution Layer for Undirectional Recurrent Neural Networks", Proceedings of the International Conference on Learning Representations, Workshop track-ICLR 2016, May 2016, San Juan, Puerto Rico, (4 pages in English).
(Continued)

*Primary Examiner* — Yogeshkumar Patel
(74) *Attorney, Agent, or Firm* — NSIP Law

(57) ABSTRACT

A neural network method and apparatus, the method including providing a voice signal to a main neural network and a sub-neural network, obtaining a scaling factor by implementing the sub-neural network configured to generate the scaling factor by interpreting the provided voice signal, determining a size of a future context, based on the scaling factor, to be considered by the main neural network configured to perform speech recognition, obtaining a result of a recognizing of the voice signal by implementing the main neural network with the determined size of the future context.

30 Claims, 13 Drawing Sheets

(51) Int. Cl.
*G10L 15/20* (2006.01)
*G10L 15/22* (2006.01)
*G10L 15/06* (2013.01)
*G06N 3/08* (2006.01)

(58) Field of Classification Search
CPC ....... G10L 19/0204; G10L 2021/02087; G10L 25/84; G10L 15/063; G10L 15/083; G06N 3/02; G06N 3/0454; G06N 3/084
USPC .................................................. 704/233, 246
See application file for complete search history.

(56) References Cited

U.S. PATENT DOCUMENTS

| | | | |
|---|---|---|---|
| 9,263,036 B1 | 2/2016 | Graves | |
| 9,342,781 B2* | 5/2016 | Cornebise | G06N 3/084 |
| 9,373,085 B1* | 6/2016 | George | G06N 5/04 |
| 9,604,359 B1* | 3/2017 | Grotmol | B25J 9/163 |
| 9,928,435 B2* | 3/2018 | El-Khamy | G06K 9/00288 |
| 10,147,442 B1* | 12/2018 | Panchapagesan | G10L 15/063 |
| 10,188,351 B2* | 1/2019 | Bae | A61B 5/7264 |
| 2001/0001141 A1* | 5/2001 | Sih | G10L 15/20 704/231 |
| 2006/0180371 A1* | 8/2006 | Breed | G07C 5/008 180/197 |
| 2008/0037803 A1* | 2/2008 | Breed | H04R 5/02 381/86 |
| 2009/0092284 A1* | 4/2009 | Breed | B60J 10/00 382/103 |
| 2015/0269481 A1* | 9/2015 | Annapureddy | G06N 3/0445 706/21 |
| 2016/0171974 A1 | 6/2016 | Hannun et al. | |
| 2016/0284349 A1* | 9/2016 | Ravindran | G10L 15/20 |
| 2016/0292567 A1* | 10/2016 | George | G06N 3/0445 |
| 2016/0335540 A1 | 11/2016 | Hinton et al. | |
| 2016/0358038 A1* | 12/2016 | Jaderberg | G06K 9/03 |
| 2017/0053646 A1* | 2/2017 | Watanabe | G10L 15/1822 |
| 2017/0098444 A1* | 4/2017 | Song | G10L 15/02 |
| 2017/0103752 A1 | 4/2017 | Senior et al. | |
| 2017/0140753 A1* | 5/2017 | Jaitly | G10L 15/26 |
| 2017/0200076 A1* | 7/2017 | Vinyals | G06N 3/0445 |
| 2017/0330586 A1* | 11/2017 | Roblek | G06F 11/0715 |
| 2018/0053500 A1* | 2/2018 | Sak | G10L 15/16 |
| 2018/0075343 A1* | 3/2018 | van den Oord | G06F 17/2818 |
| 2018/0144242 A1* | 5/2018 | Simard | G06N 3/084 |
| 2018/0261225 A1* | 9/2018 | Watanabe | G10L 15/16 |
| 2018/0322891 A1* | 11/2018 | van den Oord | G06N 3/0454 |
| 2018/0336887 A1* | 11/2018 | Song | G10L 15/16 |
| 2019/0005966 A1* | 1/2019 | Lecomte | G10L 19/005 |

OTHER PUBLICATIONS

Sak et al., "Long Short-Term Memory Based Recurrent Neural Network Architectures for Large Vocabulary Speech Recognition," *arXiv preprint arXiv*: Feb. 2014, pp. 1402.1128. (5 pages in English).

Extended European Search Report dated Oct. 2, 2018 in European Patent Application No. 18159948.1 (9 pages in English).

* cited by examiner

100

110

120

NEURAL NETWORK METHOD AND APPARATUS

CROSS-REFERENCE TO RELATED APPLICATIONS

This application claims the benefit under 35 USC § 119(a) of Korean Patent Application No. 10-2017-0103044 filed on Aug. 14, 2017 in the Korean Intellectual Property Office, the entire disclosure of which is incorporated herein by reference for all purposes.

BACKGROUND

1. Field

The following description relates to a neural network method and apparatus.

2. Description of Related Art

Recently, a technological automation of speech recognition has been implemented through processor implemented neural network models, as specialized computational architectures, that after substantial training may provide computationally intuitive mappings between input patterns and output patterns. The trained capability of generating such mappings may be referred to as a learning capability of the neural network. Further, because of the specialized training, such specially trained neural network may thereby have a generalization capability of generating a relatively accurate output with respect to an input pattern that the neural network may not have been trained for, for example.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In one general aspect, a processor implemented recognition method includes providing a voice signal to a main neural network and a sub-neural network, obtaining a scaling factor by implementing the sub-neural network configured to generate the scaling factor by interpreting the provided voice signal, determining a size of a future context, based on the scaling factor, to be considered by the main neural network configured to perform speech recognition, and obtaining a result of a recognizing of the voice signal by implementing the main neural network with the determined size of the future context.

The main neural network may include a first layer having previous time connections and a second layer having future time connections.

The determining of the size of the future context may include determining sizes of respective future contexts for respective speech recognitions by the main neural network, and the sizes of the respective future contexts may be dynamically determined dependent on respective context interpretations of voice signals by the sub-neural network.

The providing of the voice signal to the main neural network may include providing plural audio frames or windows to the main neural network, and the providing of the voice signal to the sub-neural network may include providing less than all of the plural audio frames or windows to the sub-neural network, where the sub-neural network may be configured to generate the scaling factor by interpreting the provided less than all of the plural audio frames or windows, and the main neural network may perform the recognizing of the voice signal based on the plural audio frames or windows.

For the obtaining of the scaling factor, the providing of the voice signal to the sub-neural network may include selecting between providing all of the plural frames to the sub-neural network and providing the less than all of the plural audio frames or windows to the sub-neural network.

The obtaining of the scaling factor may include obtaining, using the sub-neural network, the scaling factor as indicating a time based significance of the future context to be considered by the main neural network when recognizing the voice signal.

The obtaining of the scaling factor may include obtaining the scaling factor based a trained interpretation by the sub-neural network of a level of noise included in the voice signal and/or an accuracy of user pronunciation included in the voice signal.

The obtaining of the scaling factor may include generating the scaling factor with a relatively large number of components having values greater than a predetermined threshold based on a clarity of the voice signal being interpreted to be relatively low by the sub-neural network, such that the size of the future context may increase as a number of components that are greater than the predetermined threshold increase and may decrease as the number of the components that are greater than the predetermined threshold decrease.

The determining of the size of the future context may include determining, based on the scaling factor, the size of the future context to be relatively great as a clarity of the voice signal is interpreted to be relatively low by the sub-neural network, and the size of the future context to be relatively small or zero as the clarity of the voice signal is interpreted to be relatively high by the sub-neural network.

The determining of the size of the future context may include determining the size of the future context by comparing values of components of the scaling factor to a predetermined threshold.

The determining of the size of the future context further may include determining the size of the future context based on a highest dimension component, among all components of the scaling factor, having a value greater than the predetermined threshold.

The obtaining of the result of recognizing of the voice signal may include adjusting, based on the determined size of the future context, an extent among plural future context for provision to a lookahead convolution layer of the main neural network, implementing the main neural network based on the adjusted extent, and obtaining the result of the recognizing of the voice signal from the lookahead convolution layer implemented based on the adjusted extent.

The adjusting of the extent among the plural future context for the provision to the lookahead convolution layer may include selectively, based on the determined size of the future context, providing between zero future context to the lookahead convolution layer, some future context but not all of the plural future context to the lookahead convolution layer, and all of the plural future context to the lookahead convolution layer.

The obtaining of the scaling factor by implementing the sub-neural network may include the sub-neural network generating the scaling factor from only a first window of plural windows of the voice signal, and the obtaining of the result of recognizing of the voice signal may include obtaining the recognition result with respect to each of the plural windows.

The main neural network may be a unidirectional recurrent neural network (RNN) including a lookahead convolution layer.

The main neural network and the sub-neural network may be neural networks having been trained simultaneously.

The voice signal may be a training voice signal of training input, and the method may further include training the main neural network and the sub-neural network such that the main neural network outputs a training output, as a result of the obtaining of the result of the recognizing, mapped to the training input.

In one general aspect, provided is a non-transitory computer-readable storage medium storing instructions that, when executed by a processor, cause the processor to perform one or more or all processes or methods described herein.

In one general aspect, a processor implemented training method includes obtaining a scaling factor from a sub-neural network into which a training input is input, determining a size of a future context to be considered by a main neural network based on the scaling factor, and training the main neural network and the sub-neural network such that the main neural network outputs a training output mapped to the training input in response to the training input being input into the main neural network to which the determined size of the future context is applied, where the training of the neural network and the sub-neural network includes repeatedly performing respective recognizings of training voice signals of the training input using the main neural network with respectively determined corresponding sizes of the future context for each of the training voice signals, determined through corresponding repeated implementations of the sub-neural network with respect to the training voice signals.

The training may include training the main neural network and the sub-neural network simultaneously.

In one general aspect, a recognition apparatus includes a processor configured to provide a voice signal to a main neural network and a sub-neural network, obtain a scaling factor by implementing the sub-neural network configured to generate the scaling factor by interpreting the provided voice signal, determine a size of a future context, based on the scaling factor, to be considered by the main neural network configured to perform speech recognition, and obtain a result of a recognizing of the voice signal by implementing the main neural network with the determined size of the future context.

The apparatus may further include a memory, the memory including instructions, that when executed by the processor, cause the processor to perform the providing of the voice signal, the obtaining of the scaling factor, the determining of the size of the future context, and the obtaining of the result of the recognizing.

The apparatus may further include a memory storing respective trained parameters of the main neural network and the sub-neural network, and the processor may be further configured to apply the respective trained parameters when respectively implementing the main neural network and implementing the sub-neural network.

For the obtaining of the scaling factor, the processor may be configured to obtain, using the sub-neural network, the scaling factor as indicating a time based significance of the future context to be considered by the main neural network when recognizing the voice signal.

For the obtaining of the scaling factor, the processor may be configured to obtain the scaling factor based on a trained interpretation by the sub-neural network of a level of noise included in the voice signal and/or an accuracy of user pronunciation included in the voice signal.

For the determining of the size of the future context, the processor may be configured to determine, based on the scaling factor, the size of the future context to be relatively great as a clarity of the voice signal is interpreted to be relatively low by the sub-neural network, and the size of the future context to be relatively small or zero as the clarity of the voice signal is interpreted to be relatively high by the sub-neural network.

For the determining of the size of the future context, the processor may be configured to determine the size of the future context by comparing values of components included in the scaling factor to a predetermined threshold.

For the obtaining of the result of recognizing, the processor may be configured to adjust, based on the determined size of the future context, an extent among plural future context for provision to a lookahead convolution layer of the main neural network, implement the main neural network based on the adjusted extent, and obtain the result of the recognizing of the voice signal from the lookahead convolution layer implemented based on the adjusted extent.

The adjusting of the extent among the plural future context for the provision to the lookahead convolution layer may include selectively, based on the determined size of the future context, providing between zero future context to the lookahead convolution layer, some future context but not of the plural future context to the lookahead convolution layer, and all of the plural future context to the lookahead convolution layer.

For the determining of the size of the future context, the processor may be configured to determine sizes of respective future contexts for respective speech recognitions by the main neural network, where the sizes of the respective future contexts may be dynamically determined dependent on respective context interpretations of voice signals by the sub-neural network.

For the providing of the voice signal to the main neural network, the processor may be configured to provide plural audio frames or windows to the main neural network, and, for the providing of the voice signal to the sub-neural network, the processor may be configured to selectively provide less than all of the plural audio frames or windows to the sub-neural network, where the sub-neural network may be configured to generate the scaling factor by interpreting the provided less than all of the plural audio frames or windows, and the main neural network may be configured to perform the recognizing of the voice signal based on the plural audio frames or windows.

The recognition apparatus may be an electronic device and may further include a speech receiver configured to capture audio and the processor is configured to extract the voice signal from the captured audio, where the processor may be further configured to control non-speech recognition functions of the recognition apparatus based on interpreted commands indicated by the obtained results of the recognizing.

In one general aspect, an electronic device includes a speech receiver configured to capture audio, a memory storing trained parameters of a main neural network and trained parameters of a sub-neural network, and a processor configured to apply the trained parameters of the sub-neural network to implement the sub-neural network to which a voice signal derived from the captured audio is input, and to apply the trained parameters of the main neural network to implement the main neural network, to recognize the voice signal, with dynamically adjusted future context consideration based on results of the implementation of the sub-neural network, wherein the main neural network includes a recurrent layer configured to consider past context.

The main neural network may include an acoustic model, and the recognizing of the speech may include implementing the acoustic model to recognize a phoneme of the voice signal.

The trained parameters of the sub-neural network may configure the sub-neural network to interpret a clarity of the voice signal, with the dynamic adjusted future context consideration of the main neural network being performed by maximizing a size of the future context consideration of the main neural network when the sub-neural network interprets the clarity to be low and minimizing a size of the future context consideration of the main neural network when the sub-neural network interprets the clarity to be high.

The processor may further be configured to indicate the result of the recognizing of the voice signal.

Other features and aspects will be apparent from the following detailed description, the drawings, and the claims.

Figure 1:
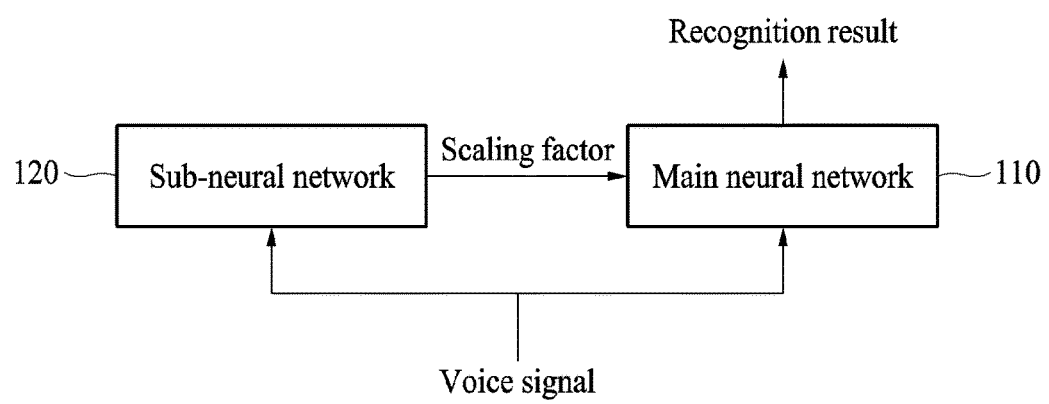
FIG. 1 illustrates an example of a process of recognizing a voice signal in a recognition apparatus.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. The sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. For example, as used herein, singular forms are intended to include plural forms as well, unless the context clearly indicates otherwise. As used herein, the singular forms "a," "an," and "the" are intended to include the plural forms as well, unless the context clearly indicates otherwise. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. As further used herein, the term "and/or" includes any and all combinations of one or more of the associated listed items. Expressions such as "at least one of," when preceding a list of elements, modify the entire list of elements and do not modify the individual elements of the list.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "coupled," or "joined" to another component, a third component may be "coupled," and "joined" between the first and second components, although the first component may be directly coupled or joined to the second component. In addition, it should be noted that if it is described in the specification that one component is "directly coupled" or "directly joined" to another component, a third component may not be present therebetween. Likewise, expressions, for example, "between" and "immediately between" and "adjacent to" and "immediately adjacent to" may also be construed as described in the foregoing. The use of the term 'may' herein with respect to an example or embodiment, e.g., as to what an example or embodiment may include or implement, means that at least one example or embodiment exists where such a feature is included or implemented while all examples and embodiments are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Examples set forth hereinafter set forth hardware for recognizing a voice using one or more neural networks and/or to train such one or more neural networks for subsequent use in such voice recognition. The examples may be implemented as any of various types of products such as a personal computer, a laptop computer, a tablet computer, a smart phone, a smart home appliance, an intelligent vehicle, a kiosk, and a wearable device. For example, the examples are used to recognize a voice of a user in the smart phone, a mobile device, or a smart home system, and/or to train a neural network to recognize a voice of a user in the corresponding device. Examples also include implementing the voice recognition to control additional functions of the corresponding device or another device.

FIG. 1 illustrates an example of a process of recognizing a voice signal in a recognition apparatus.

Referring to FIG. 1, a recognition apparatus 100 includes a main neural network 110 and a sub-neural network 120.

The recognition apparatus 100 is an apparatus configured to recognize a voice signal using the main neural network 110 and the sub-neural network 120. In an example, the recognition apparatus 100 includes a memory configured to store instructions to perform at least one operation which will be described in greater detail further below, and one or more processors configured to execute the instructions. In an example, respective configurations of the example main neural network 110 and the sub-neural network 120 may be stored in the memory of the recognition apparatus 100, such as through respective hyper parameters and trained parameters, e.g., as trained weights, which when read and implemented by a processor/processing element of the recognition apparatus 100 the main neural network 110 and the sub-neural network 120 are thereby configured.

The main neural network 110 and the sub-neural network 120 each may be respective neural networks that include a plurality of layers. Each of the plurality of layers includes a plurality of nodes, which may be defined and configured to perform predetermined activations of activation results from previous layers or of inputs based on the trained parameters. For example, nodes of hierarchically or laterally neighboring layers may be connected by weighted connections, as an example of the trained parameters. For example, after substantial repetitive adjustments during training of either or both of the main neural network 110 and the sub-neural network 120 the corresponding weights of such connections are assigned. The trained parameters may thus be stored in the memory of the recognition apparatus 100, and when acquired or loaded from the memory and then implemented by a processor/processing element of the recognition apparatus 100 the main neural network 110 and the sub-neural network 120 are thereby configured in the recognition apparatus 100 and so respective objectives the main neural network 110 and the sub-neural network 120 may be achieved for information provided to the main neural network 110 and the sub-neural network 120.

The plurality of layers of each of the neural networks include at least an input layer, a hidden layer, and an output layer, for example. During training, the input layer may be provided training data, e.g., to train the neural network and assign the trained parameters, such as through a supervised training approach. During implementation of the neural network based on non-training data, for example, the input layer receives an input to be used to perform recognition, such as from captured audio of a voice. Each respective input layer thus transmits the input to an example first hidden layer. The example output layer may generate an output of the corresponding neural network based on outputs from nodes of the example first hidden layer, such as in the example where there is a single hidden layer. Thus, the hidden layer is an intermediate layer disposed between the input layer and the output layer. Depending on the training or implementation examples, the hidden layer may thus extract features from, and/or transform the training data or recognition target data received from, the input layer to values or information that can then be used to predict or estimate the training data or recognition target data.

The main neural network 110 is configured to output a recognition result corresponding to an input voice signal further based on one or more scaling factors, i.e., based on such scaling factors in addition to the example weighted connections. The voice signal may be a signal including a user voice, and may also be referred to as a voice sequence. For example, during a preprocessing operation by the processes of the recognition apparatus 100, the voice signal may be digitized and divided into a plurality of voice frames. Herein, a frame may also be referred to as a window.

The main neural network 110 is configured to include an acoustic model, for example. Such acoustic models may output information related to, or indicative of, a most likely or closest phoneme corresponding to each frame of the input voice signal. For example, the acoustic model may provide an indication of the most likely phoneme recognition of frame(s) of the input voice signal. As an example, the indication may be represented by a multi-dimensional vector or probabilistic value(s). Based on the information output from the acoustic model, the recognition apparatus 100 may verify a word or a sentence closest to the input voice signal. The main neural network 110 may further be configured to include a language model and a decoder, such that such information of the phoneme recognitions from the acoustic model can be combined, e.g., by the decoder, with information from the language model based on the input voice signal, to similarly output a most likely or highest probabilistic word or sentence for the input voice signal.

With respect to the acoustic model, the main neural network 110 includes at least one recurrent layer and a lookahead layer, e.g., a lookahead convolution layer. The example lookahead convolution layer is a layer configured to generate an output further based on a future context of a predetermined size from the recurrent layer. For example, the recurrent layer may be configured as a unidirectional recurrent neural network (RNN) or corresponding portion of the main neural network 110. In a typical unidirectional RNN only implementation, only previous context(s) are considered for predicting or estimating a current phoneme for a current frame. However, in one or more embodiments, forward and backward context considerations may be implemented with such a unidirectional RNN or unidirectional RNN portion, as only examples, when implemented in combination with such a lookahead convolution layer, also as only an example. The lookahead convolution layer will be described in greater detail with reference to FIG. 2.

The size of the future context to be considered by the main neural network 110 is determined based on indications of one or more scaling factors, or the scaling factors themselves, received from the sub-neural network 120. For example, the main neural network 110 may selectively, based on the scaling factor(s), consider a dynamically real-time selected extent of future context, e.g., corresponding to one or more future frames or periods/windows of time, to consider when predicting or estimating the example phoneme for a current frame or time.

For example, the sub-neural network 120 may determine a scaling factor based on the input voice signal. The sub-neural network 120 may be configured as an RNN, a convolutional neural network (CNN), or a deep neural network (DNN), as only examples.

Accordingly, the scaling factor indicates a time based significance of the future context to be considered by the main neural network 110 when recognizing the voice signal at a current time. The scaling factor may be determined based on a determined or interpreted clarity of the voice signal. For example, the scaling factor may be determined based on any one or any combination of a determined or interpreted level of noise included in the voice signal and a determined or interpreted accuracy of user pronunciation included in the voice signal. Thus, the size or extent of the future context to be considered by the main neural network 110 is determined based on the scaling factor.

For example, in a case in which the level of noise included in the voice signal is determined or interpreted to be relatively high and/or the user pronunciation included in the voice signal is determined or interpreted to be relatively inaccurate, a future context of a relatively great size may be dynamically selected to be considered to recognize the voice signal accurately based on a corresponding determined or generated scaling factor. Conversely, in a case in which the level of noise included in the voice signal is determined or interpreted to be relatively low and/or the user pronunciation included in the voice signal is determined or interpreted to be relatively accurate, the voice signal may be recognized sufficiently accurately using a future context of a relatively small size, e.g., as indicated by a different scaling factor.

As described above, by adaptively adjusting the size of the future context to be considered by the main neural network 110, e.g., based on the scaling factor, voice recognition may be performed faster, more efficiently, and more accurately. For example, by selectively performing voice recognition using a future context of a minimum size based on a corresponding scaling factor, a voice recognition may be performed at a high accuracy and with a maximized response speed, compared to previous technological approaches. Rather, previous approaches may require a bidirectional RNN which requires substantial computational and memory resources, or may use merely a unidirectional RNN that can only consider previous frame contexts. For example, previous approaches may also require a fixed size or extent of future context considerations, and thus are inefficient and require substantial processing and memory resources designed for potential worst case aspects of a target voice, e.g., substantial noise or pronunciation inaccuracies. Rather, the example recognition apparatus 100 may provide for real time and dynamically sized future context considerations.

Figure 2:
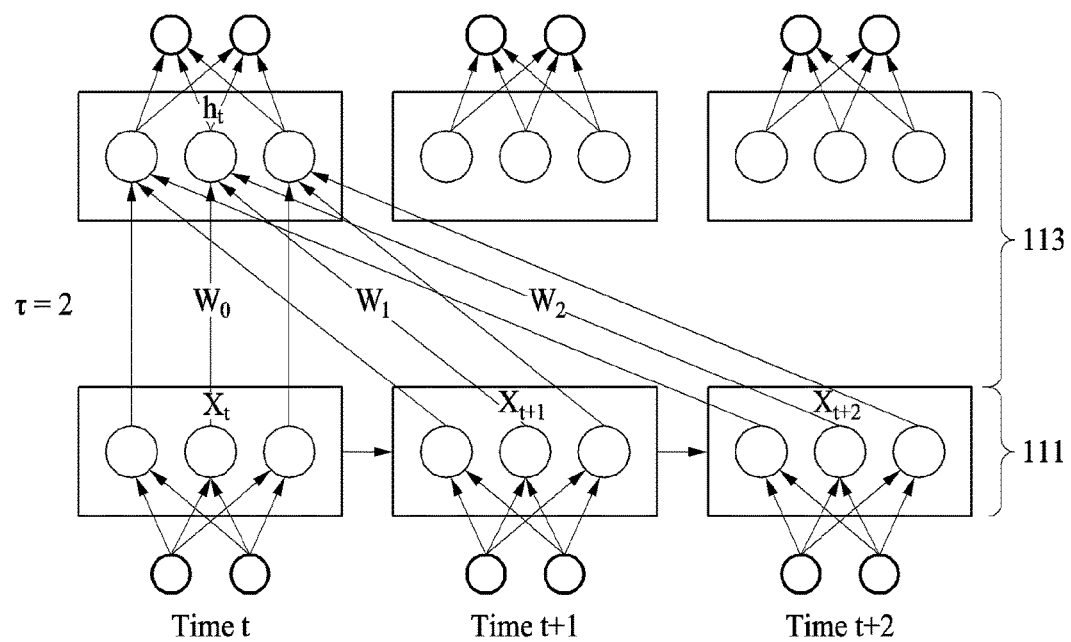
FIG. 2 illustrates an example of a main neural network.

FIG. 2 illustrates an example of a main neural network.

Referring to FIG. 2, the main neural network 110 includes a recurrent layer 111 and a lookahead convolution layer 113. For ease of description, FIG. 2 illustrates two hidden layers included in the main neural network 110, noting that additional hidden layers are also available. Thus, the main neural network 110 may include at least one hidden layer without limitation, or may include two or more hidden layers. Further, each of the hidden layers may include at least one hidden node without limitation, and in examples each hidden layer may include two or more such example hidden nodes.

As illustrated in FIG. 2, nodes belonging to hierarchically adjacent layers in the main neural network 110 are connected through weighted connections, with the weights having been learned in advance in a training process of the main neural network 110, discussed in greater detail further below.

The recurrent layer 111 is configured to provide a regression loop, e.g., with there being recurrent connections between nodes at previous times or frames. For ease of description, FIG. 2 illustrates the recurrent layer 111 being unfolded over several points in time. For example, an output $X_t$ of the recurrent layer 111 of a time t is input again into the recurrent layer 111 at a time t+1, with a new output $X_{t+1}$ being output at the time t+1. In an example, the recurrent layer 111 may be a unidirectional RNN or alternative RNN, noting that alternative examples are also available.

The lookahead convolution layer 113 considers a future context of the recurrent layer 111 of a predetermined size. For ease of description, FIG. 2 illustrates an example of a future context with a size τ of "2".

That is, the lookahead convolution layer 113 of the time t generates an output $h_t$ based on the output $X_t$ of the recurrent layer 111 of the time t, and further based on the output $X_{t+1}$ of the recurrent layer 111 of the time t+1, and an output $X_{t+2}$ of the recurrent layer 111 of a time t+2. In this example, a weight vector $W_0$ is applied to the output $X_t$ of the recurrent layer 111 of the time t, a weight vector $W_1$ is applied to the output $X_{t+1}$ of the recurrent layer 111 of the time t+1, and a weight vector $W_2$ is applied to the output $X_{t+2}$ of the recurrent layer 111 of the time t+2. As noted above, each of the weight vectors $W_0$, $W_1$, and $W_2$ may be predetermined during the training of the main neural network 110.

Herein, an output of the recurrent layer 111 at a future time to be considered by the lookahead convolution layer 113 at a current time is referred to as a future context, and a range or extent of the future time covered or considered by the lookahead convolution layer 113 at the current time is referred to as a size of the future context.

As only an example, the output $h_t$ of the lookahead convolution layer 113 of the time t may accordingly be expressed by the below Equation 1.

$$h_t = \sum_{j=0}^{\tau} w_j \odot x_{t+j} \qquad \text{Equation 1}$$

In Equation 1, $h_t$ denotes the output of the lookahead convolution layer 113 at the time t. $X_{t+j}$ denotes an output of the recurrent layer 111 at a time t+j. $w_j$ denotes the weight vector applied to the output of the recurrent layer 111 of the time t+j. Thus, in the example of FIG. 2 and as j increments from 0 to 2, $h_t$ may be generated based $W_0 * X_t + W_1 * X_{t+1} + W_2 * X_{t+2}$.

Figure 3:
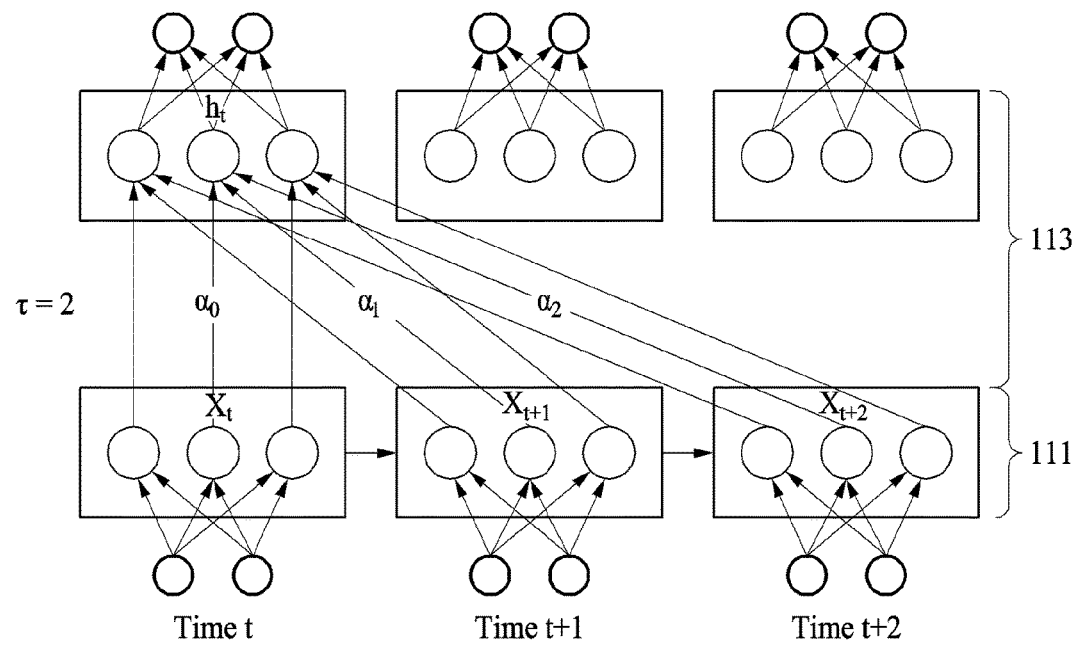
FIG. 3 illustrates an example of applying a scaling factor to a main neural network.

FIG. 3 illustrates an example of applying a scaling factor to a main neural network, such as to the main neural network 110 of FIG. 2.

Referring to FIG. 3, the example main neural network 110 includes the recurrent layer 111 and the lookahead convolution layer 113, but a scaling factor is further applied to output(s) of the recurrent layer 111 or considered in dynamically controlling which current and future contexts to consider for the current time estimation or prediction by the lookahead convolution layer 111.

For example, the scaling factor may be applied to the output of the recurrent layer 111, in conjunction with the weight vectors described with reference to FIG. 2. For example, in an example where the scaling factor is a vector with plural dimensions or coefficients, the weight vector $W_0$ and a zero$^{th}$-dimension's component $\alpha_0$ of the scaling factor may be applied to the output $X_t$ of the recurrent layer 111 of the time t, with a result of that application then being provided or transmitted to the lookahead convolution layer 113 for the time t. The weight vector $W_1$ and a first-dimension's component $\alpha_1$ of the scaling factor may be applied to the output $X_{t+1}$ of the recurrent layer 111 of the time t+1, with a result of that application being transmitted to the lookahead convolution layer 113 also for the time t. Lastly, with the example of FIG. 3, the weight vector $W_2$ and a second-dimension's component $\alpha_2$ of the scaling factor are applied to the output $X_{t+2}$ of the recurrent layer 111 of the time t+2, and with a result of this application being transmitted to the lookahead convolution layer 113 for the time t. Thus, based on the scaling factor, different emphases and extents of future context may be dynamically considered for a current frame or current time prediction or estimation of an acoustic unit of the current frame or current time. In the above example, the acoustic unit has been discussed as corresponding to a phoneme, though embodiments are not limited thereto.

Accordingly, the output $h_t$ of the lookahead convolution layer 113 of the time t to which the scaling factor is applied may be expressed by the below Equation 2, for example.

$$h_t = \sum_{j=0}^{\tau}(\alpha_j w_j) \odot x_{t+j} \quad \text{Equation 2}$$

In Equation 2, $\alpha_j$ denotes a j-dimensioned component of the scaling factor to be applied to the output of the recurrent layer 111 at the time t+j, e.g., with j incrementing from 0 to $\tau$.

An example of dynamically adjusting the size of the future context to be considered by the lookahead convolution layer 113 with the example scaling factor will be described in greater detail further below with reference to FIG. 5.

Figure 4:
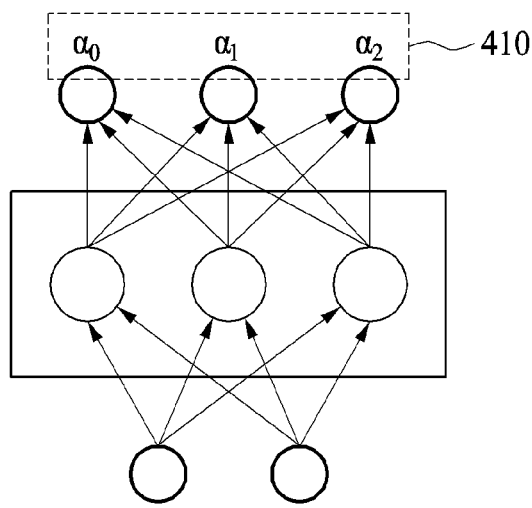
FIG. 4 illustrates an example of a sub-neural network.

FIG. 4 illustrates an example of a sub-neural network.

Referring to FIG. 4, an example of determining a scaling factor 410 by the sub-neural network 120 is illustrated. For ease of description, FIG. 4 illustrates a single hidden layer in the sub-neural network 120. However, the sub-neural network 120 includes at least one hidden layer without limitation, and examples are available where the sub-neural network 120 includes two or more hidden layers. Further, each of the hidden layers include at least one hidden node without limitation, e.g., as each of the hidden layers may further include two or more such nodes.

Nodes belonging to hierarchically adjacent layers in the sub-neural network 120 are connected through weighted connections, with the respective weights thereof having been learned in advance.

The sub-neural network 120 may be a neural network distinct from the main neural network 110 described with reference to FIG. 3. As another example, the sub-neural network 120 may be a different portion of a larger neural network that also includes the main neural network 110, e.g., with such an example neural network having input layers for each of the sub-neural network 120 and the main neural network 110. The sub-neural network 120 may be an RNN, a CNN, or a general DNN, as non-limiting examples. The sub-neural network 120 may also be referred herein to as including or being configured as a context model with respect to a voice signal, i.e., a model configured to consider a context of the voice signal. For example, one context may be an interpretable noise level of the voice signal, or another context may be an interpretable pronunciation accuracy of the voice signal, noting that additional or alternative contexts of the voice signal may be considered or interpreted by the sub-neural network 120 to generate the scaling factor 110.

Thus, the sub-neural network 120 receives an input to be recognized, and outputs the scaling factor 410 corresponding to the input. For example, the sub-neural network 120 receives a voice signal to be recognized, and outputs a scaling factor 410 corresponding to the voice signal.

In this example, the scaling factor 410 may be a total n-dimensioned vector as an element configured to scale respective weight vectors of different current and future context weighted connections from the recurrent layer 111 of the main neural network 110 of FIG. 3 to the lookahead convolution layer 113, or configured for controlling whether to implement the corresponding weight vectors based on the components of the scaling factor 410 when implementing the main neural network 110. For ease of description, FIG. 4 illustrates the scaling factor 410 corresponding to a total three-dimensioned vector, i.e., a vector with indexed zero$^{th}$, first, and second components, also referred to herein as an indexed zero$^{th}$, first, and second dimensions of the scaling factor 410, as only an example. Thus, as only a non-limiting example for convenience of explanation, the initial example dimension of the scaling factor 410 is referred to as the zero$^{th}$ dimension merely to demonstrate the initial dimension's relationship to the example current time t of FIGS. 3 and 5, e.g., corresponding to time t+zero. In this example indexing of the vector of the scaling factor 410, the indexed first dimension corresponds to time t+1, and the indexed second dimension corresponds to time t+2. The order of the dimensions or coefficients in the scaling factor 410 are not required to be in the described order, and may be generated by the sub-neural network 120 in any order. Accordingly, the discussed order or dimensions of the scaling factor 410 herein are merely for convenience of understanding, to demonstrate how any of the scaling factor coefficients of the scaling factor generated by the sub-neural network 120 may be used to control the size or extent of future context considered by the lookahead convolution layer 113 for a particular frame or time's phoneme prediction or estimation. Though the scaling factor 410 is discussed as having zero$^{th}$ through second coefficients or corresponding dimensions, the scaling factor 410 may have at least one, two, three, or more total components and corresponding total dimensions. Also, though discussed as a vector, the separate components of scaling factor 410 may be generated and output by the sub-neural network 120 separately, or in any other form.

Each component in the scaling factor 410 indicates a significance of a context corresponding to the component. In this example, the scaling factor 410 may be a vector corresponding to $<\alpha_0, \alpha_1, \alpha_2>$, with a total of three dimensions or components. For example, as illustrated in FIG. 3, the indexed zero$^{th}$-dimensioned component $\alpha_0$ in the scaling factor 410 may be applied to, or considered for, the output of the recurrent layer 111 of the time t, thereby indicating a significance of a context of the time t. Similarly, the indexed first-dimensioned component $\alpha_1$ may be applied to, or considered for, the output of the recurrent layer 111 of the time t+1, thereby indicating a significance of the context of the time t+1. The indexed second-dimensioned component $\alpha_2$ may be applied to, or considered for, the output of the recurrent layer 111 of the time t+2, thereby indicating a significance of the context of the time t+2.

The scaling factor 410 output from the sub-neural network 120 indicates a time based significance of the respective future contexts to be considered by the main neural network 110 when recognizing the voice signal. For example, the sub-neural network 120 may be configured to determine the scaling factor 410 based on a determined or interpretable clarity of the voice signal to be recognized. For example, the scaling factor 410 may be determined based on any one or any combination of a determined or interpretable level of noise included in the voice signal and a determined or interpretable accuracy of user pronunciation included in the voice signal. Here, such determinations or interpretations may be trained objectives of the sub-neural network 120, i.e., through substantial training of training data, parameters of the sub-neural network 120 may be assigned so the sub-neural network 120 is configured to interpret, from an input voice signal, aspects of a level of noise and/or an accuracy of a user's pronunciation and to generate the scaling factor 410 based on such determinations or interpretations.

In a case in which the level of noise included in the voice signal is determined or interpreted to be relatively high by the sub-neural network 120, or the accuracy of user pronunciation included in the voice signal is determined or interpreted to be relatively low by the sub-neural network 120, for example, a user may not pronounce clearly and/or slurs a speech, the scaling factor 410 is generated to include a relatively large number of components having values greater than a predetermined threshold. For example, when the clarity of the voice signal is determined or interpreted to be relatively low by the sub-neural network 120, components included in the scaling factor 410 may be generated so as to have values greater than the predetermined threshold, sequentially starting from a relatively low dimensioned component. Thus, in a case in which the clarity of the voice signal is determined or interpreted to be considerably low by the sub-neural network 120, both a low dimensioned component and a high dimensioned component included in the scaling factor 410 may be generated to have values greater than the predetermined threshold.

Conversely, in a case in which the level of noise included in the voice signal is determined or interpreted to be relatively low by the sub-neural network 120, or the accuracy of user pronunciation included in the voice signal is determined or interpreted to be relatively high by the sub-neural network 120, the scaling factor 410 may be generated so as to include a relatively small number of components having values greater than the predetermined threshold. For example, as the clarity of the voice signal is determined or interpreted to be relatively high by the sub-neural network 120, components included in the scaling factor 410 are generated so as to have values less than the predetermined threshold, sequentially starting from a relatively high dimensioned component. As another example, in a case in which the clarity of the voice signal is determined or interpreted to be considerably high by the sub-neural network 120, both a high dimensioned component and a low dimensioned component included in the scaling factor 410 are generated to have values less than the predetermined threshold. However, in another example when the clarity of the voice signal is determined or interpreted to be considerably high by the sub-neural network 120 and components of the scaling factor 410 are generated to have values less then predetermined threshold, a context of the current time may still be considered by at least generating the example zero$^{th}$-dimensioned component $\alpha_0$ of the scaling factor 410 so as to have a value greater than the predetermined threshold.

Figure 5:
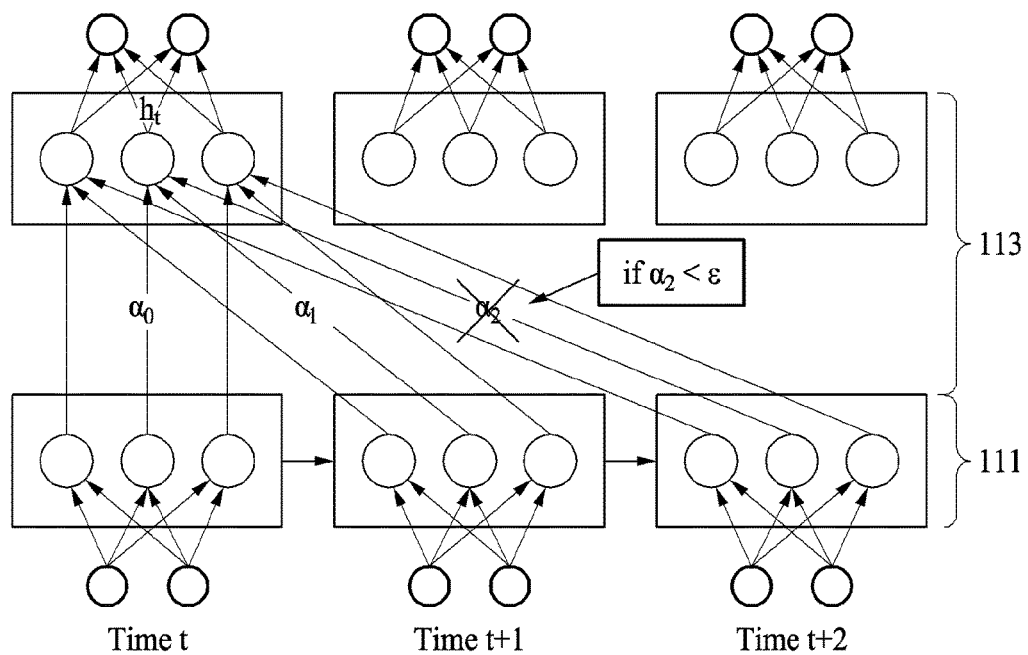
FIG. 5 illustrates an example of determining a size of a future context based on a scaling factor.

FIG. 5 illustrates an example of determining a size of a future context based on a scaling factor, such as based on the scaling factor 410 of FIG. 4.

Referring to FIG. 5, an example of adjusting the size of the future context of the lookahead convolution layer 113 included in the main neural network 110 based on the scaling factor is illustrated.

The size of the future context to be applied to the main neural network 110 is determined by comparing the components of the scaling factor, generated by the sub-neural network 120 of FIG. 4, for example, to a predetermined threshold $\in$.

For example, in a case in which, among the components included in the scaling factor, the second-dimensioned component $\alpha_2$ has a value less than the predetermined threshold $\in$, and remaining components $\alpha_0$ and $\alpha_1$ have values greater than the threshold $\in$, the size of the future context may be determined to be "1". Thus, the output of the recurrent layer 111 of the time t+2 may be excluded when determining the output of the lookahead convolution layer 113 of the time t. As non-limiting examples, the second-dimensioned component $\alpha_2$ may thus be generated to be at or near a zero value, and thus when applied to the output of the recurrent layer 111 of the time t+2 there may be a resultant zero value that is provided or transmitted to the lookahead convolution layer 113 at the time t with respect to the output of the recurrent layer 111 of the time t+2, and thus the output of the recurrent layer 111 at the time t+1 will have negligible or no effect on the operation of the lookahead convolution layer 113 at the time t, or the provision of such a zero value to the lookahead convolution layer 113 at the time t may alternatively not be performed and the lookahead convolution layer 113 at time t may only consider the outputs of the recurrent layer 111 for times t and t+1, or the weighting operation with respect to the example weight $W_2$ and the output of the recurrent layer 111 of the time t+2 may still further alternatively not be performed at all so only the resulting weighting operations with respect to the recurrent layer 111 of the times t and t+1 are performed and thus provided and considered by the lookahead convolution layer 113 at the time t.

As described above, the size of the future context is determined based on a highest dimensioned component among the components of the scaling factor having values greater than the predetermined threshold $\in$. For example, a recognition apparatus compares the plurality of components included in the scaling factor to the predetermined threshold $\in$, starting from a relatively high dimensioned component, and determines the size of the future context based on a dimension of the first component that is verified to have a value greater than the predetermined threshold $\in$.

The predetermined threshold $\in$ is a reference value to determine the size of the future context, and is experimentally determined in advance. For example, the predetermined threshold $\in$ may be determined during or before training of the main neural network 110.

The recognition apparatus uses a future context of a minimum size by adaptively or dynamically adjusting the size of the future context of the lookahead convolution layer 113 included in the main neural network 110 based on the scaling factor, whereby a high accuracy and a fast response speed may be dynamically provided, for example.

Figure 6:
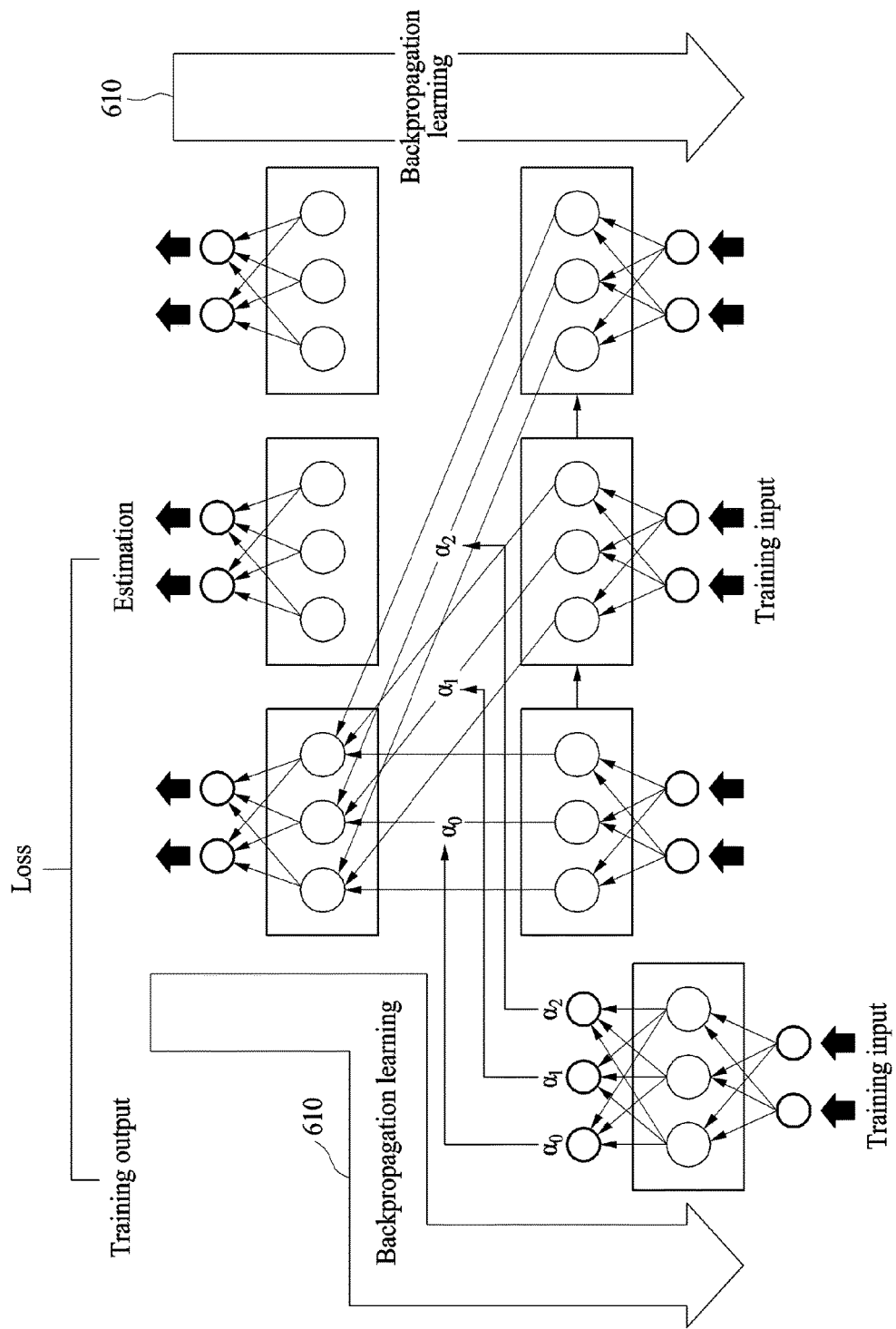
FIG. 6 illustrates an example of training a main neural network and a sub-neural network.

FIG. 6 illustrates an example of training a main neural network and a sub-neural network.

Referring to FIG. 6, the main neural network and the sub-neural network may be trained simultaneously, for example.

The main neural network and the sub-neural network are trained based on training data. The training data includes a training input and information of the corresponding labeled or expected training output. The information of the corresponding labeled or expected training output is information of the expected or predetermined appropriate output mapped, such as the expected or appropriate actual output, to respective training input. In this example, the training output may be, for example, a label that needs to be output in response to particular training input. During training, parameters of the neural network may be repetitively adjusted until the appropriate label is consistently output for such particular training input. In voice recognition, the training input may include plural voice signals, and the corresponding training output would be the predetermined accurate phoneme information of the voice signals.

The main neural network and the sub-neural network may accordingly learn their respective connection weights between their respective hierarchical layers and connection weights between the main neural network and the sub-neural network, as well as state parameters of corresponding nodes, through backpropagation learning 610.

For example, the main neural network and the sub-neural network may be trained through supervised learning. Supervised learning refers to a method of inputting a known training input into a neural network, while knowing the expected corresponding training output for that known training input, and repetitively updating or adjusting connection weights of the respective main neural network and sub-neural network and edges between the main neural network and the sub-neural network until the correct training output corresponding to the training input is output, e.g., within a predetermined level or accuracy and/or level of inaccuracy.

Backpropagation learning 610 refers to a method of estimating respective losses throughout a neural network with respect to provided training data through forward computation or implementation of the in-training neural network input the training data, and then respectively adjusting of the connection weights of the in-training neural network to reduce such losses while propagating the estimated loss in a backward direction from the output layer toward a highest hierarchical hidden layer, then the next lower hierarchical layer, etc., until the connection weights from the input layer are adjusted for reduced loss. Thus, computation or implementation of the neural network with either final trained parameters or the in-training (through repetitive adjustments) are thus performed in the forward direction for the desired recognition objective of the neural network in an order of the input layer, a next hierarchical hidden layer, a subsequent hierarchical hidden layer, etc., through to the output layer. However, in the backpropagation learning 610, the connection weights are updated in the backward direction of an opposite order of the output layer, the highest hierarchical hidden layer, the next lower hierarchical hidden layer, etc., through to the input layer.

In this example, backpropagation learning 610 may also be performed using the aforementioned dynamic consideration of future context by the lookahead convolution layer, e.g. with the size of the future context that is considered being dynamically adjusted based on the scaling factor output from the sub-neural network that is also based on the training data. For example, in a case in which the aforementioned second-dimensioned component $\alpha_2$ of the scaling factor has a value less than a predetermined threshold, and the first-dimensioned component $\alpha_1$ has a value greater than the predetermined threshold, the size of the future context of the lookahead convolution layer is adjusted to "1" and training is performed using the same. Through this, in this example, the main neural network that performs recognition and the sub-neural network that outputs the scaling factor are trained simultaneously.

The sub-neural network may also be trained through a regularizer that is configured to output the scaling factor to have components with values at or close to "0" based on the interpreted context of the training voice, e.g., to generate components with values at or close to zero when the sub-neural network interprets a training voice to be of high clarity or low noise or when the sub-neural network interprets the training voice as including more accurate pronunciations. For example, through this, the sub-neural network may be trained such that a relatively high dimensioned component, among a plurality of components included in the scaling factor, has a value at or relatively close to "0".

Figure 7:
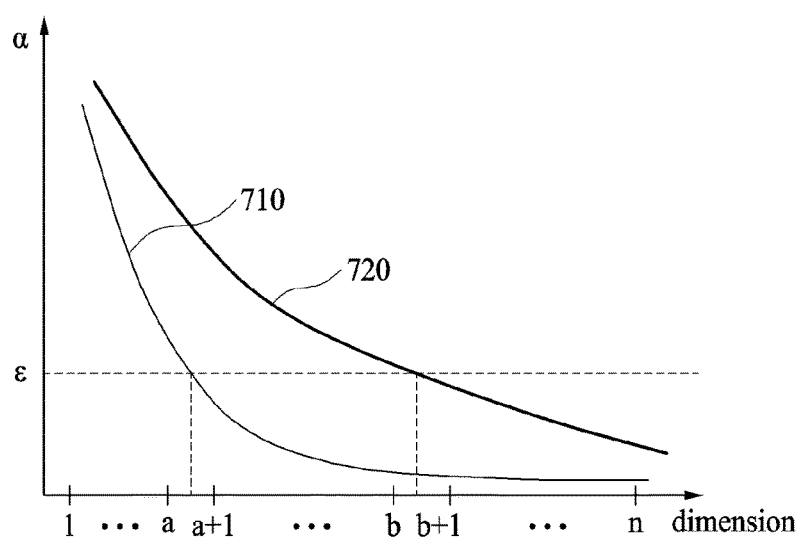
FIG. 7 illustrates scaling factor examples.

FIG. 7 illustrates scaling factor examples.

Referring to FIG. 7, a first scaling factor 710 and a second scaling factor 720 are illustrated.

The first scaling factor 710 and the second scaling factor 720 have n-dimensioned vectors, i.e., for only the purposes explanation for FIG. 7 the scaling factor vectors each will be referred to as including first through $n^{th}$ dimensions or components, output from a sub-neural network in response to different voice signals. Thus, for the purposes of explanation of FIG. 7, when n equals three, there exist respective indexed first, second, and third dimensions of each of the first scaling factor 710 and the second scaling factor 720 that respectively correspond to the aforementioned example indexed zero$^{th}$, first, and second dimensions or coefficients of the scaling factor 410 of FIG. 4.

Thus, in the example of FIG. 7, the first scaling factor 710 corresponds to a first voice signal having a clarity higher than a second voice signal that the second scaling factor 720 corresponds to. A relatively high clarity of the first voice signal may indicate that a level of noise included in the first voice signal is relatively low and/or an accuracy of user pronunciation included in the first voice signal is relatively high. In this example, when the first scaling factor 710 is relied upon to dynamically control the size of the future context considered, voice recognition of the first voice signal may still be performed with high accuracy even though the future context of a small or smaller size is considered, i.e., compared to if all available future contexts were considered for recognizing the first voice signal. For example, because of the interpreted high clarity of the first voice signal, a same high accuracy may be achieved while relying on less future context, which may result in less processing and memory resources being needed compared to when all available future contexts are considered.

Thus, the first scaling factor 710, determined based on the interpreted clarity of the first voice signal, may generally have a smaller value than the second scaling factor 720 corresponding to the second voice signal having the interpreted lower clarity. For example, when each of the first scaling factor 710 and the second scaling factor 720 are respectively compared to a predetermined threshold $\in$, the determined size of the future context to be considered by the lookahead convolution layer in the main neural network for the first voice signal may be smaller than the determined size of the future context to be considered by the lookahead convolution layer in the main neural network for the second voice signal. In this example, because the second voice signal is interpreted to have a lower clarity, additional or greater size future context may be considered to still accurately recognize the second voice signal.

Thus, as illustrated in FIG. 7, in an example of the first scaling factor 710, an (a+1)-dimensioned component of the scaling factor 710 has a generated value less than the predetermined threshold ∈, while the first-through a-dimensioned components of the scaling factor 710 have generated values greater than the predetermined threshold ∈. Thus, in the case of the first scaling factor 710, the size of the future context may be determined to "a−1". Further, in an example of the second scaling factor 720, a (b+1)-dimensioned component of the scaling factor 720 has a generated value less than the predetermined threshold ∈, while the first-through b-dimensioned components of the scaling factor 720 have generated values greater than the predetermined threshold ∈. Thus, in the case of the second scaling factor 720, the size of the future context may be determined to "b−1".

Figure 8:
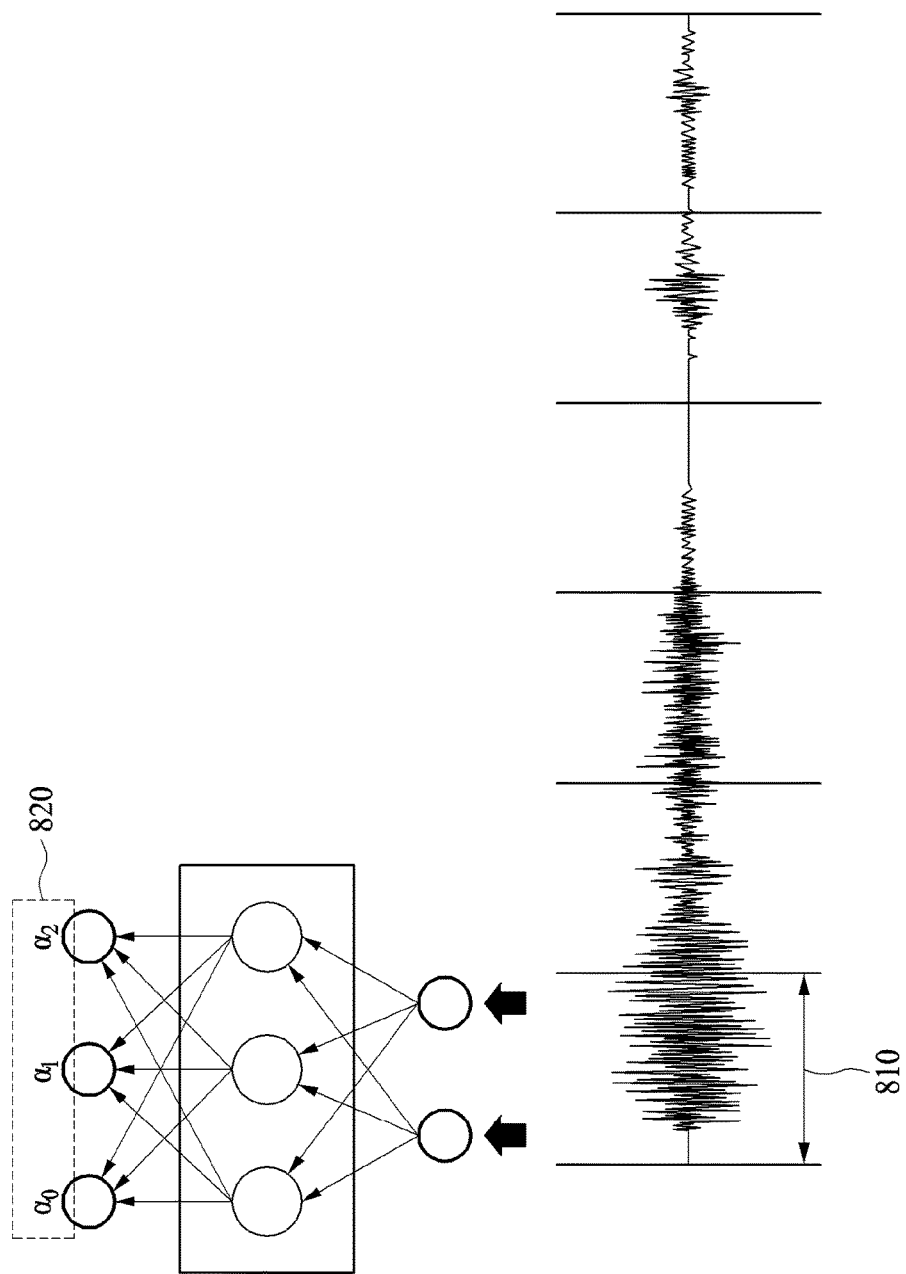
FIG. 8 illustrates an example of determining a scaling factor.

FIG. 8 illustrates an example of determining a scaling factor.

Referring to FIG. 8, an example of determining or generating a scaling factor 820 based on a window of a voice signal is illustrated.

For example, a voice may be preprocessed into the voice signal as a series of successive sequence data, represented in FIG. 8 by the illustrated divided or parsed windows of predetermined size to be respectively recognized. The size of the window may be set differently depending on embodiment. As only an example, in response to the voice signal being input, the voice signal may be predetermined to be segmented into windows of 200 milliseconds (msec) to perform voice recognition.

The scaling factor 820 may be respectively determined and generated based on the windows through a sub-neural network. A corresponding scaling factor 820 may thus be determined for each window. Depending on whether the voice is a captured voice preprocessed into the successive data of the predetermine window sizes, or whether the voice is predetermined training data of such successive data of such predetermined window sizes, corresponding recognition or training with respect to each window may be performed by dynamically adjusting the size of the future context for a lookahead convolution layer based on the respectively determined/generated scaling factors 820 for each corresponding window.

In another example, the scaling factor 820 may be determined or generated with respect to the illustrated first window 810 of the voice signal, and recognition or training with respect to all the windows may be performed using the lookahead convolution layer having the size of the future context adjusted based on a scaling factor 820 determined with respect to only the first window 810. For example, the recognition and/or training apparatus may be implemented with such a single window approach when it is predetermined or determined by the recognition or training apparatus that a level of noise or an accuracy of user pronunciation in the same voice signal does not greatly change or vary.

In another example, such as due to additional resources being made available and/or determined unnecessary for real time processing, such as in a case of training, and thus for examples that may be relatively less sensitive to response speed, the scaling factor 820 may be determined for each window. However, in a case of recognition relatively sensitive to response speed, recognition with respect to all the windows may be performed using the scaling factor 820 determined with respect to only the first window 810 of the voice signal.

Figure 9:
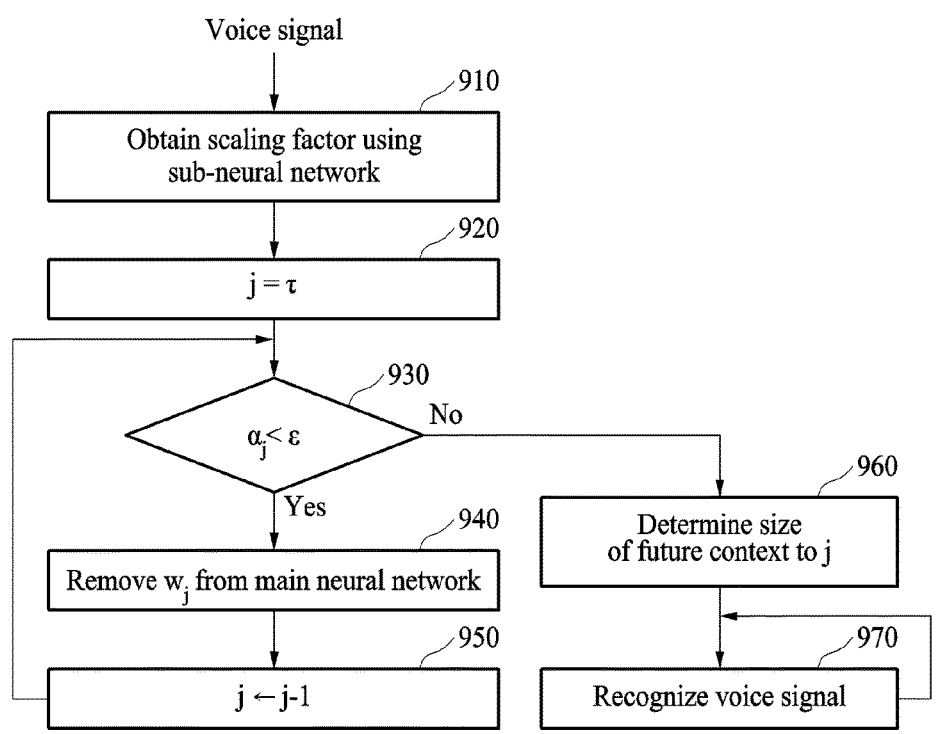
FIG. 9 illustrates an example of a recognition method.

FIG. 9 illustrates an example of a recognition method.

Referring to FIG. 9, a recognition method performed by one or more processors of a recognition apparatus is illustrated.

In operation 910, the recognition apparatus obtains a scaling factor based on a review or analyses of a voice signal using a sub-neural network. The scaling factor indicates a time based significance of future context(s) to be considered by a main neural network that is configured with an acoustic model when recognizing the voice signal. For example, the scaling factor is determined based on any one or any combination of a determined or interpreted level of noise included in the voice signal and a determined or interpreted accuracy of user pronunciation included in the voice signal, e.g., as interpreted by the sub-neural network and based on the trained objectives of the sub-neural network. The scaling factor includes a τ-dimensioned vector, i.e., meaning herein a vector with zero$^{th}$, first, second, . . . τ$^{th}$ dimensions or coefficients.

In operation 920, the recognition apparatus first considers a highest dimensioned component in the scaling factor, by setting j to be equal to τ. Here, j refers to an indexed dimension or component of the scaling factor, and thus with j being set to be equal to τ, the τ$^{th}$ dimension or component of the scaling factor is first considered.

In operation 930, the recognition apparatus determines whether the set j-dimensioned component $\alpha_j$ of the scaling factor has a value less than a predetermined threshold ∈.

In response to determination that the j-dimensioned component $\alpha_j$ of the scaling factor has a value less than the predetermined threshold ∈, the recognition apparatus removes or extracts a weight vector $w_j$ from the main neural network, in operation 940. The weight vector $w_j$ is a weight to be applied to an output of a recurrent layer of a time t+j to be transmitted to a lookahead convolution layer for a time t. That is, by removing or extracting the weight vector $w_j$ from the main neural network, a future context of the time t+j is excluded from the consideration for the time t. In another example, the removal or extraction may merely be implemented by performing the implementation of the main neural network without performing any weighting of the output of the recurrent layer of a time t+j, which further may include implementing the main neural network for time t based on future context from up to but before time t+j, for example, as the output of time t+j is no longer considered with respect the recognition for the time t.

In operation 950, the recognition apparatus sets a next dimension to be considered to be one dimension less or lower than the dimension of operation 930. For example, if j immediately previous equaled τ, and the operation 930 found that the τ$^{th}$ dimension or component of the scaling factor was less than the predetermined threshold ∈ in operation 930, then operation 950 would reduce j to be equal to τ−1.

Thus, as illustrated in FIG. 9, if in operation 930 the recognition apparatus determined that the current j-dimensioned component $\alpha_j$ of the scaling factor has a value less than the predetermined threshold ∈, then operations 930 through 950 are iteratively repeated until the then current j-dimensioned component $\alpha_j$ has a value greater than the predetermined threshold ∈.

In response to the determination of operation 930 that the then current j-dimensioned component $\alpha_j$ of the scaling factor has a value greater than the predetermined threshold ∈, in operation 960 the recognition apparatus adjusts or determines a size of the future context that will be considered by the lookahead convolution layer included in the main neural network to correspond to the then current j.

In operation 970, the recognition apparatus recognizes the voice signal using the main neural network including the lookahead convolution layer having the adjusted size j of the future context.

The description provided with reference to FIGS. 1 through 8 are applicable to operations of FIG. 9, and thus duplicated description will be omitted herein merely for conciseness.

Figure 10:
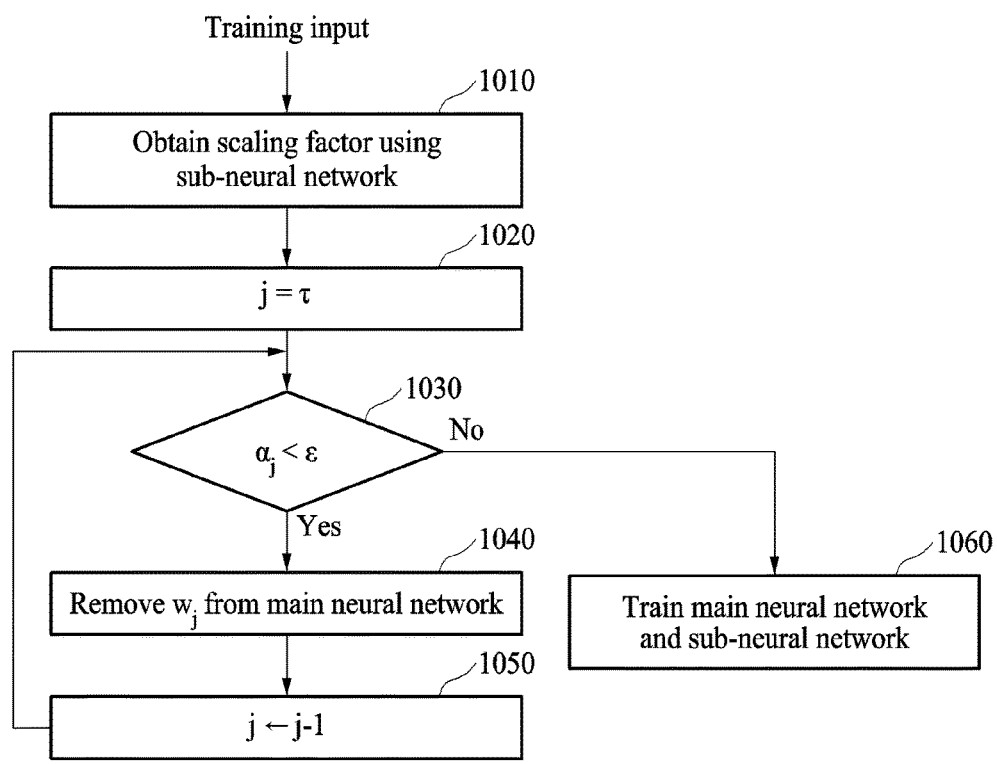
FIG. 10 illustrates an example of a training method.

FIG. 10 illustrates an example of a training method.

Referring to FIG. 10, a training method performed by one or more processors of a training apparatus is illustrated. Here, though the recognition method of FIG. 9 and the training method of FIG. 10 are explained through implementation by respective one or more processors of recognition or training apparatuses, examples also exist where the recognition apparatus is also configured to implement the training method, e.g., with same one or more processors of the recognition apparatus being configured to perform both the recognition and training methods.

In operation 1010, the training apparatus obtains a scaling factor based on a review or analyses of training input using a sub-neural network.

In operation 1020, the training apparatus first considers a highest dimensioned component in the scaling factor. For example, the training apparatus sets j to be equal to $\tau$, so the first j-dimensioned component considered by the training apparatus is the $\tau^{th}$ dimension or component of the scaling factor.

In operation 1030, the training apparatus determines whether a j-dimensioned component $\alpha_j$ of the scaling factor has a value less than a predetermined threshold $\in$.

In response to the determination that the j-dimensioned component $\alpha_j$ of the scaling factor has a value less than the predetermined threshold $\in$, the training apparatus removes or extracts a weight vector $w_j$ from the main neural network, in operation 1040. As noted above, the weight vector $w_j$ is a weight to be applied to an output of a recurrent layer of a time t+j to be transmitted to a lookahead convolution layer for a time t. That is, by removing or extracting the weight vector $w_j$ from the main neural network, a future context of the time t+j is excluded from the consideration. Here, the weight vectors maybe in-training weight vectors that are incrementally or iteratively adjusted based on different forward passes and backward propagation of losses. When the training of the weight vectors is complete, e.g., when the respective neural networks achieve a predetermined accuracy level or predetermined inaccuracy level, the final trained weight vectors may be stored in a memory of the training apparatus. The trained weight vectors are also provided to the recognition apparatus and stored in a memory of the recognition apparatus, e.g., for configuring the recognition apparatus to respectively include the main neural network and the sub-neural network.

In operation 1050, the training apparatus sets a next dimension to be considered to be one dimension less or lower than the dimension of operation 1030.

Thus, as illustrated in FIG. 10, if in operation 1030, the training apparatus determined that the current j-dimensioned component $\alpha_j$ of the scaling factor has a value less than the predetermined threshold $\in$, then operations 1030 through 1050 are iteratively repeated until the then current j-dimensioned component $\alpha_j$ has a value greater than the predetermined threshold $\in$.

In response to the determination in operation 1030 that the then current j-dimensioned component $\alpha_j$ of the scaling factor has a value greater than the predetermined threshold $\in$, in operation 1060 the training apparatus adjusts or determines a size of the future context of the lookahead convolution layer included in the main neural network to j.

In operation 1060, the training apparatus further trains the main neural network including the lookahead convolution layer that considers the adjusted size j of the future context and the sub-neural network. For example, the training apparatus trains the main neural network and the sub-neural network simultaneously such that a training output is output in response to the training input using the main neural network including the lookahead convolution layer having the adjusted size j of the future context and the sub-neural network.

The description provided with reference to FIGS. 1 through 9 are applicable to operations of FIG. 10, and thus duplicated description will be omitted herein merely for conciseness.

Figure 11:
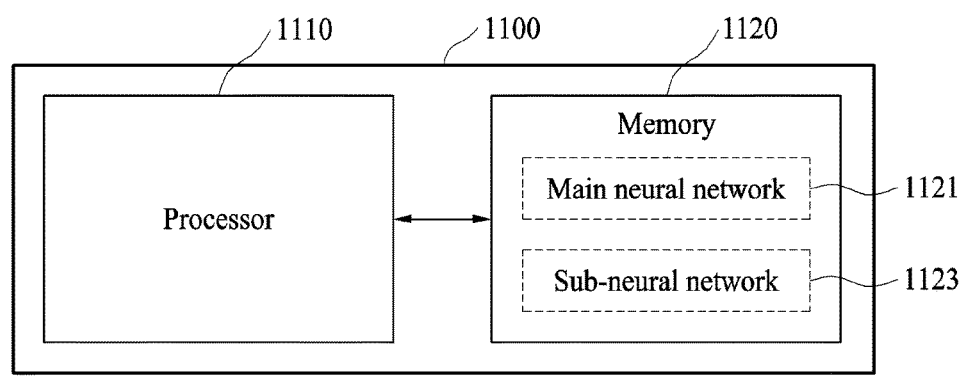
FIG. 11 illustrates an example of a recognition apparatus.

FIG. 11 illustrates an example of a recognition apparatus.

Referring to FIG. 11, a recognition apparatus 1100 includes a processor 1110 and a memory 1120. The processor 1110 and the memory 1120 may respectively represent one or more processors and one or more memories.

The memory 1120 is configured to store trained parameters of the main neural network 1121 and the sub-neural network 1123, as described above. Further, the memory 1120 includes computer-readable instructions. The processor 1110 may perform the aforementioned operations with respect to FIGS. 1-10 in response to the instructions stored in the memory 1120 being executed by the processor 1110. The memory 1120 is a volatile memory or a non-volatile memory.

The processor 1110 may obtain or read the stored trained parameters of the main neural network 1121 and the sub-neural network 1123 from the memory 1120, and upon implementation of the obtained or read parameters be configured to include the main neural network 1121 and the sub-neural network 1123. For example, the processor 1110 may be configured to implement the main neural network 1121 and the sub-neural network 123 by obtaining or reading the stored trained parameters and applying the same to input audio, to implement the main neural network 1121 and the sub-neural network 1123 to perform recognition of the audio. Thus, the processor 1110 may be configured to obtain data associated with the main neural network 1121 and the sub-neural network 1123 from the memory 1120, and configured to perform operations associated with the main neural network 1121 and the sub-neural network 1123 to perform recognition of audio input.

The processor 1110 is configured to generate or obtain a scaling factor from the sub-neural network 1123 into which the audio is input, e.g., a voice signal, determine a size of a future context to be considered by the main neural network 1121 based on the scaling factor, and obtain a result of recognizing the voice signal output from the main neural network 1121 in response to the voice signal being input into the main neural network 1121 to which the determined size of the future context is applied. The same audio may be input to the main neural network 1121 as the sub-neural network 1123, or only a portion of the audio may be input to the sub-neural network while all audio is input to the main neural network, such as in an example where the scaling factor is determined from only a select window of the audio, or respectively for only select intermittent or non-sequential windows of time. Thus, the processor 1110 may be configured to dynamically adjust the size of the future context considered in a recurrent based acoustic model based on a determined context of the audio signal, e.g., based on a neural network context model interpreting varied levels of clarity of the input audio signal, when performing recognition of the audio signal.

Figure 12:
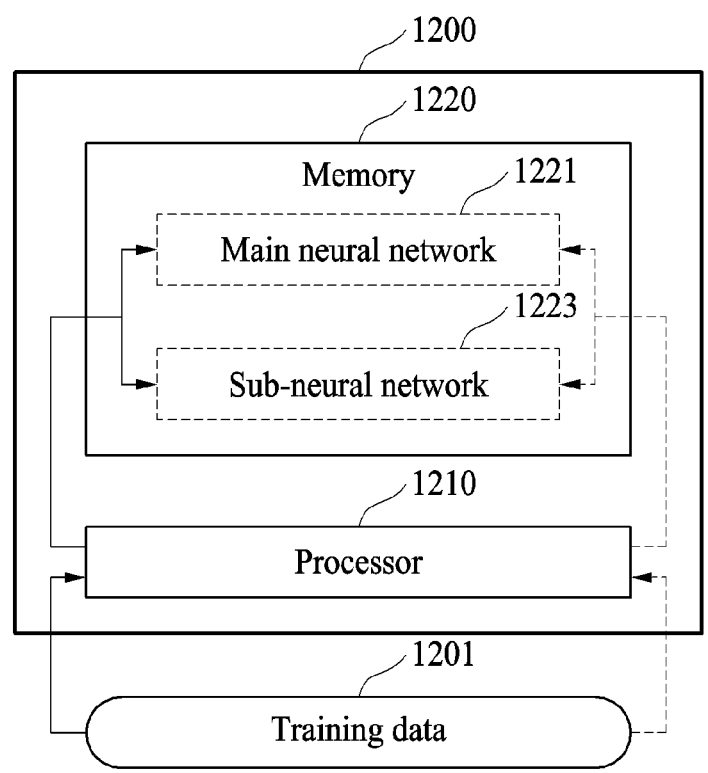
FIG. 12 illustrates an example of a training apparatus.
Figure 13:
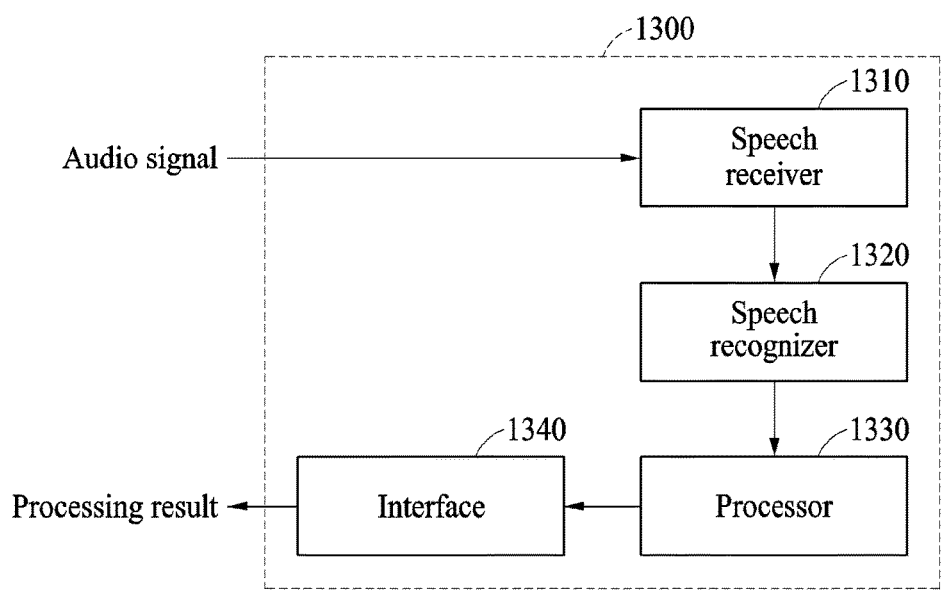
FIG. 13 illustrates an example of an electronic device.

In addition, the descriptions provided above with respect to FIGS. 1-10 and below with respect to FIGS. 12 and 13 are applicable to the recognition apparatus 1100, and thus duplicated description will be omitted herein for conciseness.

FIG. 12 illustrates an example of a training apparatus.

Referring to FIG. 12, a training apparatus 1200 includes a processor 1210 and a memory 1220. The processor 1210 and the memory 1220 may respectively represent one or more processors and one or more memories.

The memory 1220 is configured to store parameters of a main neural network 1221 and a sub-neural network 1223 as described above. For example, the memory 1220 may store in-training parameters of the main neural network 1221 and the sub-neural network 1223, as the respective parameters are adjusted during the training process. Final trained parameters of the main neural network 1221 and the sub-neural network 1223 may also be stored in the memory 1220. In an example, with the final trained parameters of the main neural network 1221 and the sub-neural network 1223, the main neural network 1221 and the sub-neural network 1223 may be the same as the main neural network 1121 and the sub-neural network 1123 of FIG. 11. Further, the memory 1220 includes computer-readable instructions.

The processor 1210 may perform the aforementioned operations with respect to FIGS. 1-10 in response to the instructions stored in the memory 1220 being executed by the processor 1210. The processor 1210 obtains the main neural network 1221 and the sub-neural network 1223 from the memory 1220, e.g., based on respective predetermined initial neural network parameters. The processor 1210 the trains the main neural network 1221 and the sub-neural network 1223 based on training data 1201, until the main neural network 1221 and the sub-neural network 1223 are trained and the final respective trained parameters are determined.

The training data 1201 includes a training input and at least information of a training output. The training input is input data to be input into the main neural network 1221 and the sub-neural network 1223, and includes, for example, voice data. The training output or information about the training output is data mapped to the training input, and is, for example, a label that is predetermined to be output from the main neural network 1221 in response to particular training input being input into the main neural network 1221 and the sub-neural network 1223.

The processor 1210 trains the main neural network 1221 and the sub-neural network 1223 to generate the training output in response to the training input. Training the main neural network 1221 and the sub-neural network 1223 includes training the parameters of the main neural network 1221 and the sub-neural network 1223, updating the main neural network 1221 and the sub-neural network 1223, or updating the parameters of the main neural network 1221 and the sub-neural network 1223, until training of the main neural network 1221 and the sub-neural network 1223 are determined complete. For example, until the respective neural networks have respective predetermined levels of accuracy or predetermined levels of inaccuracy, as only non-limiting examples.

The processor 1210 is configured to generate or obtain a scaling factor from the sub-neural network 1223 into which the training input is input, and determines a size of a future context to be considered by the main neural network 1221 based on the scaling factor. The processor 1210 trains the main neural network 1221 and the sub-neural network 1223 such that the main neural network 1221 outputs the training output mapped to the training input in response to the training input being input into the main neural network 1221 to which the determined size of the future context is applied.

The main neural network 1221 operates based on the output of the sub-neural network 1223, for example, the scaling factor, and thus the main neural network 1221 and the sub-neural network 1223 are trained simultaneously, as explained in greater detail further above.

In addition, the descriptions provided above with respect to FIGS. 1-11 are applicable to the training apparatus 1200, and thus duplicated description will be omitted herein for conciseness.

FIG. 13 is a block diagram illustrating a speech recognition apparatus, as an electronic device 1300, according to one or more embodiments.

In one or more embodiments, the electronic device 1300 may include a speech recognition device, such as either or both of the speech recognition apparatuses 100 and 1100, of FIGS. 1 and 11, and/or the training apparatus 1200 of FIG. 12. The electronic device 1300 may be any of a TV set, a set-top box, a desktop computer, a laptop computer, a translating machine, a smartphone, a tablet PC, a smart watch, a wearable device, electronic control device of a vehicle, and the like, as only non-limiting examples, and may process a user's various demands or commands as recognized by the electronic device 1200, for example, and with respect to the electronic device 1300 or another electronic device. However, the electronic device 1300 is not limited thereto, and other electronic devices used in any or all applications of speech recognition may also be used.

Referring to FIG. 13, in an embodiment, the electronic device 1300 includes a speech receiver 1310, a speech recognizer 1320, and a processor 1330, in which the speech recognizer 1320 may correspond to any of the speech recognition apparatuses and/or training apparatuses described above with respect to FIGS. 1-12. The speech recognizer 1320 is hardware that may be implemented by a particular one or more processing devices such as discussed above, or may be implemented by a particular one or more processing devices as discussed above that are also configured to control other operations of the electronic device 1300, such as user interface operations in response to recognized commands or queries through the recognition results of the speech recognizer 1320, though embodiments are not limited thereto.

The speech receiver 1310 may receive a user's audio signal input through a microphone and the like included in the electronic device 1300, and also represented by the speech receiver 1310. Alternatively, in one or more embodiments, the speech receiver 1310 may be included in a separate device of the corresponding speech recognition system embodiment, such as a wired or wireless microphone or controller that is configured to transmit the received or captured audio and/or corresponding preprocessed audio of the received/captured audio when the speech receiver 1310 is further configured, in an example, to implement preprocessing of the received/captured audio, to the speech recognition device of the speech recognition system. The audio signal may be related to words, phrases, or sentences or commands for controlling the electronic device 1300 or another electronic device. In addition, as only an example, such preprocessing may include converting a received or captured analog audio signal, e.g., audibly input by a user, into a digital signal, dividing the digital signal into a plurality of audio frames or windows, and transmitting the audio frames to the speech recognizer 1320, e.g., as preprocessed audio frame data. Stored audio or stored preprocessed audio may alternatively be provided to the speech recognizer 1320, e.g., without capturing by the speech receiver 1310. Thus, in one or more embodiments one or more of an example context model, acoustic model, language model, and decoder may be implemented by one or more remote servers, as the speech recognizer 1320, or by the speech recognizer 1320 of the electronic device 1300. In an example where the speech recognizer 1320 is configured on or as a remote server, the electronic device 1300 may be configured to transmit captured audio, for example, and receive the appropriate outputs from the example acoustic model, both acoustic model and language model, or decoder model, as one or more neural network(s).

Thus, in differing embodiments, the speech recognizer 1320 may input results of the acoustic model, or results of the acoustic model and language model into a decoder or subsequent layer(s) of a corresponding unified neural network, and may output a final recognition result of an audio signal based on the output results of the decoder or unified model.

In addition to embodiments where such a processor 1330 is specially controlled or configured to include or operate as the speech recognizer 1320, the processor 1330 may further control and/or perform additional operations of the electronic device 1300, e.g., including operations that may control current or further operations of the electronic device 1300 in response to the final recognition result returned by the speech recognizer 1320. For example, the processor 1330 may output the recognition result of speech input by a user in a processor generated voice through a speaker of the electronic device 1300 and the like, or may provide the recognition result in a text format on a display of the electronic device 1300, such for drafting messages or documents, or merely for display by the electronic device 1300. Further, the processor 1330 may be configured to perform alternative operations, such as controlling the electronic device 1300 to perform additional non-speech recognition operations or to process commands (e.g., power on/off, volume control, music selection, etc.) regarding the electronic device 1300. Thus, recognition apparatus 1300 may indicate the result of the recognition either through explicit or inferential indications, e.g., with an example explicit indication being the example of recognition apparatus 1300 displaying or audibly outputting the result, while the inferential indication may include such the alternative example operations of the electronic device 1300 being selectively implemented based on the result. The interface 1340 represents the speaker, one or more user interfaces of the electronic device 1300, such as a display, keyboard, and/or touch screen, and/or one or more communication hardware modules of the electronic device 1300, such as to perform the above referenced transmissions with the example server, as only non-limiting examples. In an example, the interface 1340 may also further represent the microphone that generates the audio signal preprocessed by the speech recognizer 1310.

The memory of the electronic device 1300, such as demonstrated by the memories 1120 and 1220 of FIGS. 11 and 12 or another memory of the electronic device 1300, may also store the context, acoustic, and language models, e.g., as the aforementioned neural network(s), as well different such context, acoustic, and language models, as well as data used to train the models or resulting from such training, and any information used or generated by the speech recognizer 1320, for example. The memory may also store executable instructions so one or more processors of the electronic device 1300 may implement any of the above described operations, as well as instructions for implementing or executing further applications of the electronic device 1300.

The recognition apparatus 100, the recognition apparatus 1100, processor 1110, memory 1120, the training apparatus 1200, processor 1210, memory 1220, electronic device 1300, speech receiver 1310, speech recognizer 1320, processor 1330, and interface 1340, as only examples, and other apparatuses, hardware modules, devices, and other components described herein with respect to FIGS. 1-13 and that perform operations described in this application are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The processes and methods demonstrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented recognition method, comprising:
   providing a voice signal to a main neural network and a sub-neural network;
   obtaining a scaling factor by implementing the sub-neural network configured to generate the scaling factor by interpreting the provided voice signal;
   determining a size of a future context, based on the scaling factor, to be considered by the main neural network configured to perform speech recognition; and
   obtaining a result of a recognizing of the voice signal by implementing the main neural network with the determined size of the future context.

2. The recognition method of claim 1, wherein the main neural network includes a first layer having previous time connections and a second layer having future time connections.

3. The recognition method of claim 1, wherein the determining of the size of the future context includes determining sizes of respective future contexts for respective speech recognitions by the main neural network, the sizes of the respective future contexts being dynamically determined dependent on respective context interpretations of voice signals by the sub-neural network.

4. The recognition method of claim 1, wherein the providing of the voice signal to the main neural network includes providing plural audio frames or windows to the main neural network, and the providing of the voice signal to the sub-neural network includes providing less than all of the plural audio frames or windows to the sub-neural network,
   wherein the sub-neural network is configured to generate the scaling factor by interpreting the provided less than all of the plural audio frames or windows, and the main neural network performs the recognizing of the voice signal based on the plural audio frames or windows.

5. The recognition method of claim 1, wherein, for the obtaining of the scaling factor, the providing of the voice signal to the sub-neural network includes selecting between providing all of the plural audio frames or windows to the sub-neural network and providing less than all of the plural audio frames or windows to the sub-neural network.

6. The recognition method of claim 1, wherein the obtaining of the scaling factor comprises obtaining, using the sub-neural network, the scaling factor as indicating a time based significance of the future context to be considered by the main neural network when recognizing the voice signal.

7. The recognition method of claim 6, wherein the obtaining of the scaling factor comprises obtaining the scaling factor based a trained interpretation by the sub-neural network of a determined or interpreted level of noise included in the voice signal and/or a determined or interpreted accuracy of user pronunciation included in the voice signal.

8. The recognition method of claim 6, wherein the obtaining of the scaling factor includes generating the scaling factor with a relatively large number of components having values greater than a predetermined threshold based on a clarity of the voice signal being interpreted to be relatively low by the sub-neural network, such that the size of the future context increases as a number of components that are greater than the predetermined threshold increase and decreases as the number of the components that are greater than the predetermined threshold decrease.

9. The recognition method of claim 1, wherein the determining of the size of the future context includes:
determining, based on the scaling factor, the size of the future context to be greater as a clarity of the voice signal is determined or interpreted to be relatively low by the sub-neural network than as the clarity of the voice signal is determined or interpreted to be relatively high by the sub-neural network, and
determining, based on the scaling factor, the size of the future context to be smaller or zero as the clarity of the voice signal is interpreted to be relatively high by the sub-neural network than as the clarity of the voice signal is determined or interpreted to be relatively low by the sub-neural network.

10. The recognition method of claim 1, wherein the determining of the size of the future context includes determining the size of the future context by comparing values of components of the scaling factor to a predetermined threshold.

11. The recognition method of claim 10, wherein the determining of the size of the future context further includes determining the size of the future context based on a determined highest dimension component, among all components of the scaling factor, having a value greater than the predetermined threshold.

12. The recognition method of claim 1, wherein the obtaining of the result of recognizing of the voice signal comprises:
adjusting, based on the determined size of the future context, an extent among plural future context for provision to a lookahead convolution layer of the main neural network;
implementing the main neural network based on the adjusted extent; and
obtaining the result of the recognizing of the voice signal from the lookahead convolution layer implemented based on the adjusted extent.

13. The recognition method of claim 12, wherein the adjusting of the extent among the plural future context for the provision to the lookahead convolution layer includes selectively, based on the determined size of the future context, providing between zero future context to the lookahead convolution layer, some future context but not all of the plural future context to the lookahead convolution layer, and all of the plural future context to the lookahead convolution layer.

14. The recognition method of claim 1, wherein the obtaining of the scaling factor by implementing the sub-neural network includes the sub-neural network generating the scaling factor from only a first window of plural windows of the voice signal, and the obtaining of the result of recognizing of the voice signal includes obtaining the recognition result with respect to each of the plural windows.

15. The recognition method of claim 1, wherein the main neural network is a unidirectional recurrent neural network (RNN) including a lookahead convolution layer.

16. The recognition method of claim 1, wherein the main neural network and the sub-neural network are neural networks having been trained simultaneously.

17. A non-transitory computer-readable storage medium storing instructions that, when executed by a processor, cause the processor to perform the method of claim 1.

18. A processor implemented training method, comprising:
obtaining a scaling factor from a sub-neural network into which a training input is input;
determining a size of a future context to be considered by a main neural network based on the scaling factor; and
training the main neural network and the sub-neural network such that the main neural network outputs a training output mapped to the training input in response to the training input being input into the main neural network to which the determined size of the future context is applied.

19. The training method of claim 18, wherein the training comprises training the main neural network and the sub-neural network simultaneously.

20. A recognition apparatus, comprising:
a processor configured to
provide a voice signal to a main neural network and a sub-neural network,
obtain a scaling factor by implementing the sub-neural network configured to generate the scaling factor by interpreting the provided voice signal,
determine a size of a future context, based on the scaling factor, to be considered by the main neural network configured to perform speech recognition, and
obtain a result of a recognizing of the voice signal by implementing the main neural network with the determined size of the future context.

21. The recognition apparatus of claim 20, further comprising a memory, the memory including instructions, that when executed by the processor, cause the processor to perform the providing of the voice signal, the obtaining of the scaling factor, the determining of the size of the future context, and the obtaining of the result of the recognizing.

22. The recognition apparatus of claim 20, further comprising a memory storing respective trained parameters of the main neural network and the sub-neural network, and the processor is further configured to apply the respective trained parameters when respectively implementing the main neural network and implementing the sub-neural network.

23. The recognition apparatus of claim 20, wherein, for the obtaining of the scaling factor, the processor is configured to obtain, using the sub-neural network, the scaling factor as indicating a time based significance of the future context to be considered by the main neural network when recognizing the voice signal.

24. The recognition apparatus of claim 23, wherein, for the obtaining of the scaling factor, the processor is configured to obtain the scaling factor based on a trained interpretation by the sub-neural network of a determined or interpreted level of noise included in the voice signal and/or a determined or interpreted accuracy of user pronunciation included in the voice signal.

25. The recognition apparatus of claim 20, wherein, for the determining of the size of the future context, the processor is configured to:
- determine, based on the scaling factor, the size of the future context to be greater as a clarity of the voice signal is determined or interpreted to be relatively low by the sub-neural network than as the clarity of the voice signal is determined or interpreted to be relatively high by the sub-neural network, and
- determine, based on the scaling factor, the size of the future context to be smaller or zero as the clarity of the voice signal is interpreted to be relatively high by the sub-neural network than as the clarity of the voice signal is determined or interpreted to be relatively low by the sub-neural network.

26. The recognition apparatus of claim 20, wherein, for the determining of the size of the future context, the processor is configured to determine the size of the future context by comparing values of components included in the scaling factor to a predetermined threshold.

27. The recognition apparatus of claim 20, wherein the recognition apparatus is an electronic device and further comprises a speech receiver configured to capture audio and the processor is configured to extract the voice signal from the captured audio,
- wherein the processor is further configured to control non-speech recognition functions of the recognition apparatus based on interpreted commands indicated by the obtained results of the recognizing.

28. An electronic device, the electronic device comprising, comprising:
- a speech receiver configured to capture audio;
- a memory storing trained parameters of a main neural network and trained parameters of a sub-neural network; and
- a processor configured to apply the trained parameters of the sub-neural network to implement the sub-neural network to which a voice signal derived from the captured audio is input, and to apply the trained parameters of the main neural network to implement the main neural network, to recognize the voice signal, with dynamically adjusted future context consideration based on results of the implementation of the sub-neural network,
- wherein the main neural network includes a recurrent layer configured to consider past context.

29. The electronic device of claim 28, wherein the trained parameters of the sub-neural network configure the sub-neural network to interpret a clarity of the voice signal, with the dynamic adjusted future context consideration of the main neural network being performed by maximizing a size of the future context consideration of the main neural network when the sub-neural network interprets the clarity to be low and minimizing a size of the future context consideration of the main neural network when the sub-neural network interprets the clarity to be high.

30. The electronic device of claim 28, wherein the processor is further configured to indicate the result of the recognizing of the voice signal.

* * * * *